United States Patent
Rajwat

(10) Patent No.: US 10,820,167 B2
(45) Date of Patent: Oct. 27, 2020

(54) SYSTEMS AND METHODS FOR AUTOMATED CONTENT SHARING WITH A PEER

(71) Applicant: Facebook, Inc., Menlo Park, CA (US)

(72) Inventor: Paresh Jayant Rajwat, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 92 days.

(21) Appl. No.: 15/499,785

(22) Filed: Apr. 27, 2017

(65) Prior Publication Data

US 2018/0317061 A1  Nov. 1, 2018

(51) Int. Cl.
| | | |
|---|---|---|
| *H04W 4/21* | (2018.01) | |
| *H04L 12/58* | (2006.01) | |
| *H04L 29/08* | (2006.01) | |
| *H04W 8/00* | (2009.01) | |
| *H04W 84/12* | (2009.01) | |
| *H04W 84/18* | (2009.01) | |
| *H04W 4/80* | (2018.01) | |
| *H04W 4/02* | (2018.01) | |

(52) U.S. Cl.
CPC ............ *H04W 4/21* (2018.02); *H04L 51/32* (2013.01); *H04L 67/1095* (2013.01); *H04L 67/24* (2013.01); *H04W 8/005* (2013.01); *H04W 4/023* (2013.01); *H04W 4/80* (2018.02); *H04W 84/12* (2013.01); *H04W 84/18* (2013.01)

(58) Field of Classification Search
CPC ....... H04W 4/21; H04W 8/005; H04W 4/023; H04W 4/80; H04W 84/18; H04W 84/12; H04L 67/1095; H04L 67/24; H04L 51/32
See application file for complete search history.

(56) References Cited

U.S. PATENT DOCUMENTS

| | | | | |
|---|---|---|---|---|
| 7,743,044 | B1 * | 6/2010 | Kalogeraki | H04L 67/104 707/706 |
| 7,818,811 | B2 * | 10/2010 | Kirovski | G06Q 20/06 705/52 |
| 7,882,092 | B2 * | 2/2011 | Dasgupta | G06F 16/172 707/705 |
| 8,036,598 | B1 * | 10/2011 | Zhu | H04L 51/20 455/41.1 |
| 8,117,303 | B2 * | 2/2012 | Fonsen | G06F 16/9574 709/224 |
| 8,243,655 | B2 * | 8/2012 | Larsson | H04W 84/18 370/328 |

(Continued)

*Primary Examiner* — Patrice L Winder
(74) *Attorney, Agent, or Firm* — Sheppard Mullin Richter & Hampton LLP

(57) ABSTRACT

Systems, methods, and non-transitory computer readable media can detect, by a first computing system, a second computing system that is capable of communicating with the first computing system based on a local area communication protocol. It can be determined, by the first computing system, that the second computing system is in an offline mode in relation to a system. It can be determined, by the first computing system, whether a content item is on the second computing system. The content item can be sent, by the first computing system, to the second computing system based on the local area communication protocol, in response to determining that the content item is not on the second computing system.

20 Claims, 8 Drawing Sheets

(56) References Cited

U.S. PATENT DOCUMENTS

| | | | | |
|---|---|---|---|---|
| 8,627,411 B2* | 1/2014 | Li | G06F 21/606 | 726/3 |
| 8,725,682 B2* | 5/2014 | Young | H04L 67/10 | 707/610 |
| 9,112,875 B2* | 8/2015 | Zaid | H04L 63/0407 | |
| 9,197,696 B1* | 11/2015 | Jakatdar | H04L 67/06 | |
| 9,491,225 B2* | 11/2016 | Liu | H04L 67/06 | |
| 9,584,508 B2* | 2/2017 | Panchapakesan | H04L 9/0822 | |
| 9,762,562 B2* | 9/2017 | Maguire | H04L 63/08 | |
| 9,769,244 B2* | 9/2017 | Hunt | H04L 67/10 | |
| 9,800,688 B2* | 10/2017 | Pottier | H04L 67/34 | |
| 10,051,048 B2* | 8/2018 | Haebler | H04W 4/029 | |
| 10,157,428 B2* | 12/2018 | Lewis | H04L 67/02 | |
| 2002/0083145 A1* | 6/2002 | Perinpanathan | H04L 29/06 | 709/213 |
| 2004/0019640 A1* | 1/2004 | Bartram | H04L 67/104 | 709/205 |
| 2006/0010203 A1* | 1/2006 | Mrsic-Flogel | H04N 21/4126 | 709/205 |
| 2006/0095582 A1* | 5/2006 | Nitya | H04W 28/065 | 709/236 |
| 2007/0208782 A1* | 9/2007 | Carter | G06F 8/65 | |
| 2008/0059656 A1* | 3/2008 | Saliba | H04L 67/1095 | 709/248 |
| 2009/0210512 A1* | 8/2009 | Steinhart | H04N 1/00132 | 709/218 |
| 2010/0153521 A1* | 6/2010 | Lor | G06F 17/30 | 709/219 |
| 2011/0145327 A1* | 6/2011 | Stewart | G06F 17/3002 | 709/203 |
| 2012/0151006 A1* | 6/2012 | McInerney | H04N 21/42204 | 709/219 |
| 2013/0268582 A1* | 10/2013 | Sitati | H04L 67/42 | 709/203 |
| 2013/0297698 A1* | 11/2013 | Odero | H04L 69/24 | 709/204 |
| 2014/0012913 A1* | 1/2014 | Varoglu | H04W 76/14 | 709/204 |
| 2014/0229436 A1* | 8/2014 | Wang | G06F 16/178 | 707/622 |
| 2014/0229582 A1* | 8/2014 | Liu | H04L 67/06 | 709/219 |
| 2014/0297742 A1* | 10/2014 | Lyren | H04L 65/403 | 709/204 |
| 2015/0019717 A1* | 1/2015 | Li | H04L 67/1085 | 709/224 |
| 2015/0230078 A1* | 8/2015 | Kandangath | H04L 67/1095 | 707/647 |
| 2018/0220353 A1* | 8/2018 | Mendiola | H04B 7/15 | |

\* cited by examiner

400

Detect, by a first computing system, a second computing system that is capable of communicating with the first computing system based on a local area communication protocol
402

Determine, by the first computing system, that the second computing system is in an offline mode in relation to a system
404

Determine, by the first computing system, whether a content item is on the second computing system
406

Send, by the first computing system, the content item to the second computing system based on the local area communication protocol, in response to determining that the content item is not on the second computing system
408

FIGURE 4

SYSTEMS AND METHODS FOR AUTOMATED CONTENT SHARING WITH A PEER

FIELD OF THE INVENTION

The present technology relates to content sharing. More particularly, the present technology relates to techniques for sharing content items between peer computing systems.

BACKGROUND

Users often utilize computing devices for a wide variety of purposes. Users can use their computing devices to, for example, interact with one another, access content items, share content items, and create content items. In some cases, content items can be provided by users of a social networking system. The content items can include one or a combination of text, images, videos, and audio. The content items may be published to the social networking system for consumption by others.

Under conventional approaches, content items can be maintained by a social networking system. In some instances, computing devices of users of the social networking system can access content items through a wide area network connection with the social networking system. For example, content items can be downloaded through the network connection from the social networking system to a computing device of a user. A quality of the network connection and data usage costs associated with the network connection are some factors that can limit sizes and amounts of content items downloaded by the computing device.

SUMMARY

Various embodiments of the present disclosure can include systems, methods, and non-transitory computer readable media configured to detect, by a first computing system, a second computing system that is capable of communicating with the first computing system based on a local area communication protocol. It can be determined, by the first computing system, that the second computing system is in an offline mode in relation to a system. It can be determined, by the first computing system, whether a content item is on the second computing system. The content item can be sent, by the first computing system, to the second computing system based on the local area communication protocol, in response to determining that the content item is not on the second computing system.

In some embodiments, the local area communication protocol includes one or more of: Bluetooth, Wi-Fi Direct, or a wireless ad hoc network.

In certain embodiments, the system is a social networking system, and the first computing system and the second computing system are associated with respective users of the social networking system.

In an embodiment, it can be determined whether eligibility criteria associated with the content item is satisfied by a user associated with the second computing system, and the content item can be sent to the second computing system in response to determining that the eligibility criteria is satisfied.

In some embodiments, the eligibility criteria relates to one or more of: privacy settings associated with the content item or demographic characteristics associated with the content item.

In certain embodiments, a second content item from the second computing system can be received when the first computing system is in the offline mode.

In an embodiment, information relating to the second content item and one or more user activities associated with the second content item can be synchronized with the system, in response to determining that the first computing system is not in the offline mode.

In some embodiments, the one or more user activities include one or more of: commenting, liking, or sharing.

In certain embodiments, it can be determined whether the second computing system satisfies criteria based on one or more of: resources associated with the second computing system, or a history of sending content items by the first computing system to the second computing system, and the content item can be sent to the second computing system in response to determining that the criteria is satisfied.

In an embodiment, the determining, by the first computing system, whether the content item is on the second computing system can comprise determining whether all portions of the content item are on the second computing system. The sending, by the first computing system, the content item to the second computing system, in response to determining that the content item is not on the second computing system, can comprise sending at least some portions of the content item that are not on the second computing system, in response to determining that not all portions of the content item are on the second computing system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example first method for providing automated sharing of content items in a peer to peer manner, according to an embodiment of the present disclosure.

DETAILED DESCRIPTION

Automated Content Sharing with a Peer

Figure 1:
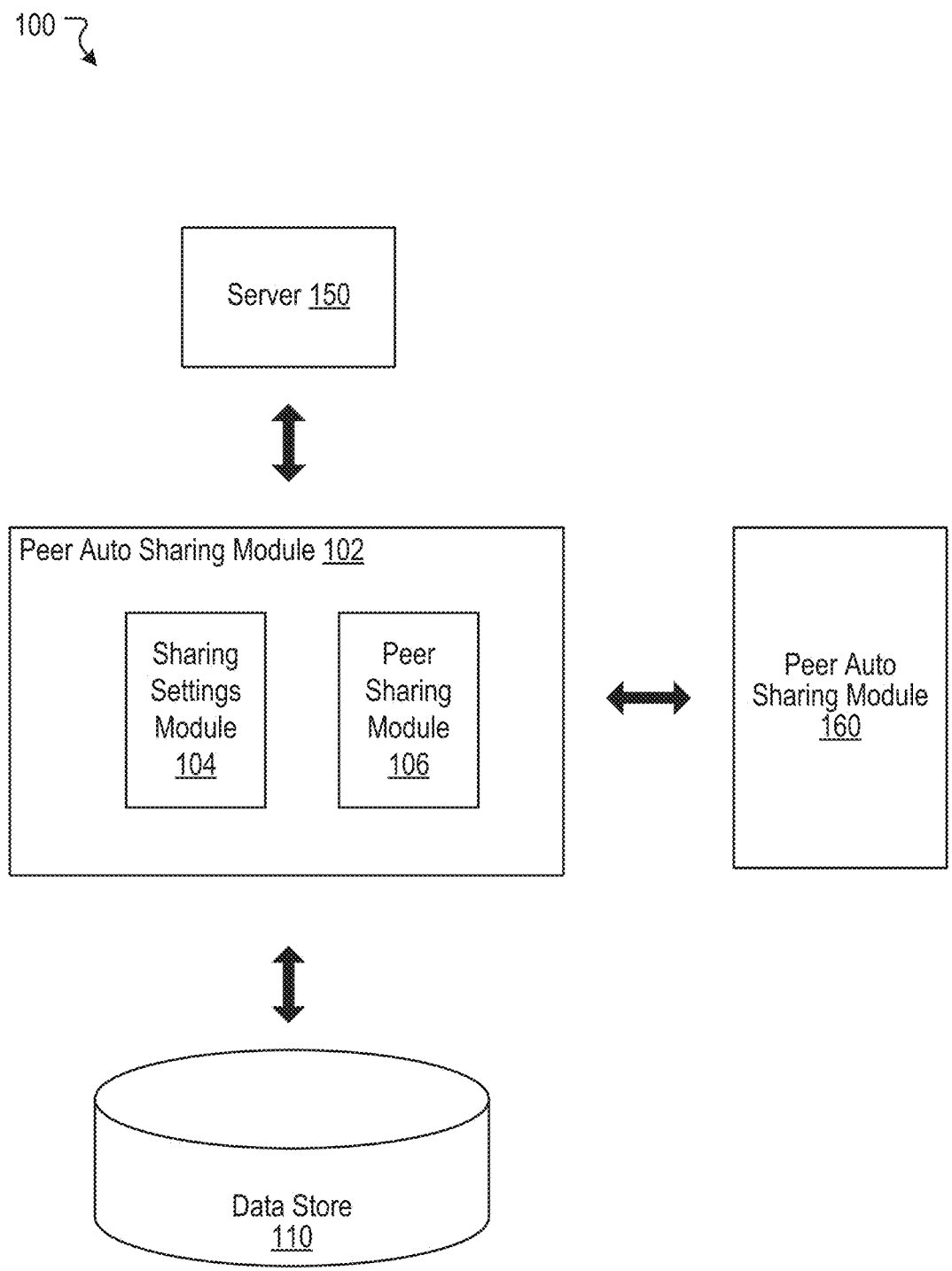
FIG. 1 illustrates an example system including an example peer auto sharing module configured to provide automated sharing of content items in a peer to peer manner, according to an embodiment of the present disclosure.

Users often utilize computing devices for a wide variety of purposes. Users can use their computing devices to, for example, interact with one another, access content items, share content items, and create content items. In some cases, content items can be provided by users of a social networking system. The content items can include one or a combination of text, images, videos, and audio. The content items may be published to the social networking system for consumption by others.

Under conventional approaches, content items can be maintained by a social networking system. In some instances, computing devices of users of the social networking system can access content items through a wide area network connection with the social networking system. For example, content items can be downloaded through the network connection from the social networking system to a computing device of a user. A quality of the network connection and data usage costs associated the network connection are some factors that can limit sizes and amounts of content items downloaded by the computing device. For example, in certain regions where wide area network communications have bandwidth constraints or are associated with significant data usage costs, users can be discouraged from downloading content items.

An improved approach rooted in computer technology can overcome the foregoing and other disadvantages associated with conventional approaches specifically arising in the realm of computer technology. Based on computer technology, the disclosed technology can provide automated sharing of content items between peer computing devices, for example, in an offline mode. Examples of peer computing devices can include mobile devices. In the offline mode, computing devices may not be connected to a social networking system. However, a first computing device and a second computing device can be in sufficient proximity to establish a connection based on a local area communication protocol, such as Bluetooth, Wi-Fi Direct, wireless ad-hoc network, etc. In such cases, the first computing device and the second computing device can share content items based on a local area communication protocol. The first computing device can check whether the second computing device has a content item and whether the second computing device satisfies eligibility criteria associated with the content item. If the second computing device does not already have the content item and satisfies the eligibility criteria, the first computing device can send the content item to the second computing device using a local area communication protocol. Similarly, the second computing device can send a content item to the first computing device using a local area communication protocol. Computing devices can opt in to use automated sharing of content items in the offline mode. In this manner, the disclosed technology can increase content items in a user's content item inventory even when the user's device is operating in the offline mode. Computing devices can optimize sending of content items to other computing devices based on various factors, such as resources associated with the other computing devices, a history of sending content items to the other computing devices (e.g., success or failure of previous attempts to send content items), etc. Information relating to content items received in the offline mode can be synchronized with a server of the social networking system when computing devices are no longer in the offline mode. Details relating to the disclosed technology are explained below.

FIG. 1 illustrates an example system 100 including an example peer auto sharing module 102 configured to provide automated sharing of content items in a peer to peer manner, according to an embodiment of the present disclosure. The content items can include any types of content, such as, for example, text, videos, images, audio, etc. In some embodiments, the peer auto sharing module 102 can be implemented on a first computing device, such as a first instance of a user device 610 in FIG. 6. The peer auto sharing module 102 can download content items from a content platform associated with at least one server 150. In some embodiments, the server 150 can be part of a social networking system 630 in FIG. 6. After a content item is downloaded, the peer auto sharing module 102 can provide the content item from the first computing device to a second computing device, such as a second instance of a user device 610 on which a peer auto sharing module 160 is implemented. In some embodiments, the peer auto sharing module 160 can be identical or similar in design and operation to the peer auto sharing module 102. While provision of a content item in a peer to peer manner may be discussed herein for purposes of illustration and understanding, the present technology also applies to provision of one or more content items. The present technology has many applications. For example, in one application where wide area network communications have bandwidth constraints or are associated with significant data usage costs, the provision of content items between computing devices in a peer to peer manner, rather than from a server to the computing devices, can optimize access to the content items. For illustrative purposes, the disclosed technology is described in connection with a social networking system, but the disclosed technology can apply to any type of application and/or system.

The peer auto sharing module 102 can include a sharing settings module 104 and a peer sharing module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the peer auto sharing module 102 can be implemented in any suitable combinations.

The sharing settings module 104 can determine settings associated with automated sharing of content items between peer computing devices. Sharing of content items between peer computing devices can be available when at least one computing device is in an offline mode. Content items can be provided by a social networking system, and the offline mode can refer to a mode in which a computing device is not connected to the social networking system. A computing device may operate in the offline mode due to various reasons, such as a lack of a wide area network connection, a selection of the offline mode, etc. When a computing device is in the offline mode, another computing device that may or may not be in the offline mode can send content items to the computing device based on a local area communication protocol, such as Bluetooth, Wi-Fi Direct, wireless ad-hoc network, etc.

The sharing settings module 104 can provide various settings associated with sharing of content items in the offline mode. Users can opt in to automated sharing functionality. In some embodiments, when users are opted in to the functionality, sharing of content items can be provided automatically without further input from users. For example, sharing of content items can occur when two computing devices are in proximity and can use local connections. In certain embodiments, when users are opted in to the functionality, sharing of content items can be triggered, and users can be prompted to accept content items. Users can opt out of the automated sharing functionality subsequent to opting in. The sharing settings module 104 can also allow users to opt out of or stop the automated sharing functionality temporarily. All examples herein are provided for illustrative purposes, and there can be many variations and other possibilities.

The peer sharing module 106 can share content items between peer computing devices. A computing device that sends content items can be referred to as a "sender computing device," and a computing device that receives content items can be referred to as a "recipient computing device." For example, a sender computing device can send content items to one or more recipient computing devices in the offline mode that are in sufficient proximity to establish a connection using a local area communication protocol. A sender computing device can send content items received from a server associated with a social networking system, content items received from other computing devices in the offline mode, content items created on the sender computing device (e.g., in the offline mode), etc. Content items received on a computing device in the offline mode can be accessed and viewed by a user associated with the computing device via the user's feed (e.g., newsfeed), the user's profile, other users' profiles, etc. Content items received in the offline mode can include any type of content, such as text, image, video, audio, etc. Functionality of the peer sharing module 106 is described in more detail herein.

In some embodiments, the peer auto sharing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the peer auto sharing module 102 can be, in part or in whole, implemented as software running on one or more computing devices or systems. For example, the peer auto sharing module 102 can be implemented as or within a dedicated application (e.g., app), a program, or an applet running on a user computing device or client computing system. In some instances, the peer auto sharing module 102 can be, in part or in whole, implemented within or configured to operate in conjunction or be integrated with client computing device, such as a user device 610 of FIG. 6. As another example, the peer auto sharing module 102 can be, in part or in whole, implemented within or configured to operate in conjunction or be integrated with a social networking system (or service), such as a social networking system 630 of FIG. 6. It should be understood that many variations are possible.

The system 100 can include a data store 110 configured to store and maintain various types of data, such as data relating to support of and operation of the peer auto sharing module 102. The data maintained by the data store 110 can include, for example, information relating to content items received in the offline mode, sharing criteria associated with content items, communications with peer computing devices associated with content items, synchronizing with a server, logs relating to activities in the offline mode, etc. The data store 110 also can maintain other information associated with a social networking system. The information associated with the social networking system can include data about users, social connections, social interactions, locations of connections, and media content items. As shown in the example system 100, the peer auto sharing module 102 can be configured to communicate and/or operate with the data store 110. In some embodiments, the data store 110 can be implemented on a computing device that implements the peer auto sharing module 102.

Figure 2:
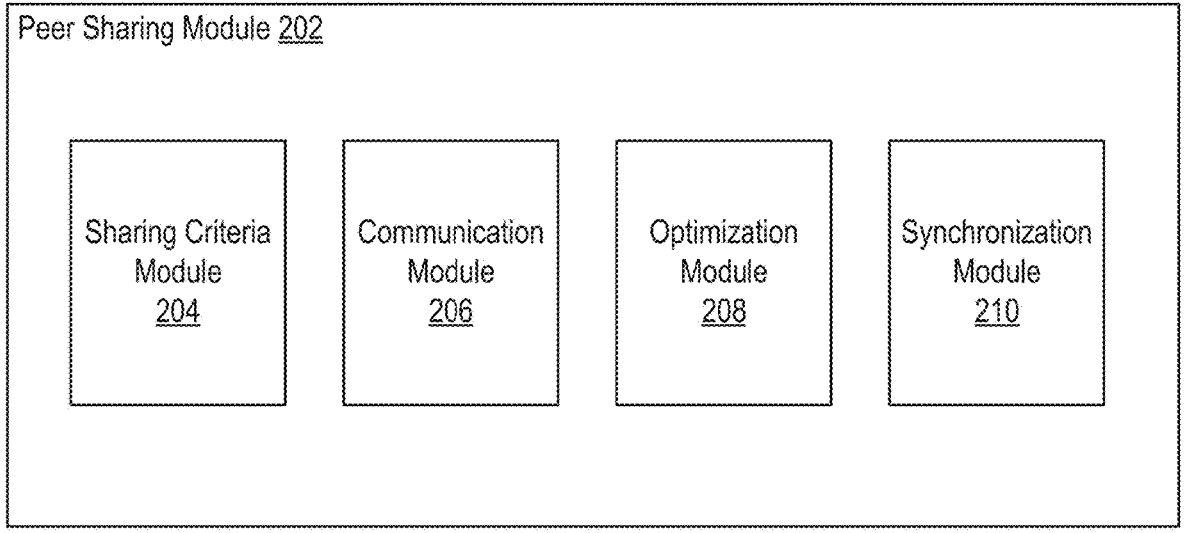
FIG. 2 illustrates an example peer sharing module configured to share content items between peer computing devices, according to an embodiment of the present disclosure.

FIG. 2 illustrates an example peer sharing module 202 configured to share content items between peer computing devices, according to an embodiment of the present disclosure. In some embodiments, the peer sharing module 106 of FIG. 1 can be implemented with the example peer sharing module 202. As shown in the example of FIG. 2, the example peer sharing module 202 can include a sharing criteria module 204, a communication module 206, an optimization module 208, and a synchronization module 210.

The sharing criteria module 204 can determine criteria for sharing content items between peer computing devices. Before a computing device sends a content item to another computing device, the computing device can check various criteria for sharing the content item. A sender computing device can send a content item to a recipient computing device if the criteria for sharing the content item is satisfied. The criteria can include whether a recipient computing device already has a content item available on the recipient computing device. A content item can have a unique identifier (ID) associated with it, and the ID can be used to check whether the recipient computing device already has the content item that is a candidate for sending. In some embodiments, the criteria can also include whether the recipient computing device has an up-to-date version of a content item, whether the recipient computing device has the entire content item, etc. If the recipient computing device does not have the up-to-date version of the content item, the sender computing device can send updates for a content item to the recipient computing device. A content item can have multiple parts, such as main content, comments, likes, etc. If the recipient computing device only has certain parts of the content item and not the entire content item, the sender computing device can send a remainder of the content item or a portion thereof to the recipient computing device. Incrementally sending a content item is explained further below.

The criteria can also include eligibility criteria associated with a content item that should be satisfied for the content item to be shared. The eligibility criteria can include criteria that should be satisfied by a user associated with the recipient computing device. For example, the eligibility criteria can include privacy settings associated with a content item. Privacy settings can refer to any type of setting that can indicate whether a content item is accessible to a user. Examples of privacy settings can include a degree of connection of a user of a recipient computing device to a user associated with a content item. For example, a user can specify that a content item is only accessible to the user's connections, and accordingly the content item is not sent to another user who is not a connection of the user. The eligibility criteria can also include demographic characteristics associated with a content item. A content item can be available to users who have certain demographic characteristics. For example, a content item can be available to users in a particular geographical region. Examples of demographic characteristics can include an age, an age range, a geographical region (e.g., country, state, city, etc.), a gender, a device manufacturer, a device model, etc. The eligibility criteria can further include other criteria associated with a content item that may limit access to the content item. Public content as well as private content can be shared between computing devices. For public content, it may not be necessary to check whether some or all of eligibility criteria associated with a content item is met or not (e.g., privacy settings).

The criteria can further include criteria relating to resources of the recipient computing device and/or the sender computing device. An example of resources can include a battery of a computing device. Content items may not be sent if the recipient computing device and/or the sender computing device has a low battery level. For example, if the battery level of the recipient computing device satisfies a threshold value, a content item is not sent to the recipient computing device. Similarly, if the battery level of the sender computing device satisfies a threshold value, a content item is not sent by the sender computing device. There can be similar threshold values for other resources associated with the recipient computing device and/or the sender computing device that, upon satisfaction, cause a sender computing device not to send content items to a recipient computing device. All examples herein are provided for illustrative purposes, and there can be many variations and other possibilities.

The communication module 206 can communicate with a recipient computing device and send one or more content items to the recipient computing device as appropriate. The communication module 206 can detect one or more recipient computing devices. The communication module 206 can cause a sender computing device to perform a scan around a position of the sender computing device based on a local area communication protocol to identify other nearby computing devices. The local area communication protocol can include, for example, Bluetooth, Wi-Fi Direct, or a wireless ad hoc network. The identified recipient computing devices can be within a local area of the sender computing device. In some embodiments, the local area can be a distance or geographical region in which the sender computing device can establish communications, such as local area communications, with another computing device, such as the recipient computing device, in a peer to peer manner.

The communication module 206 can establish a peer to peer communication connection between the sender computing device and the recipient computing device. Establishment of the communication connection can be based on a particular local area communication protocol supporting communication between the sender computing device and the recipient computing device. The establishment of the communication connection can include creation of a physical communication channel between the computing devices and a handshaking technique to set up communication.

The communication module 206 can initially communicate with the recipient computing device to determine whether the criteria for sharing a content item is satisfied by the recipient computing device. For example, the initial communication can determine whether the content item is already on the recipient computing device. The initial communication can also determine whether a user of the recipient computing device satisfies the eligibility criteria associated with the content item. In some embodiments, the sender computing device can send eligibility criteria associated with the content item to the recipient computing device. In such embodiments, the recipient computing device can determine whether the eligibility criteria is satisfied by the recipient computing device and provide a response to the sender computing device regarding whether the eligibility criteria is satisfied. In other embodiments, the sender computing device can receive anonymized information relating to the eligibility criteria from the recipient computing device, and the sender computing device can determine whether the eligibility criteria is satisfied by the recipient computing device. The initial communication can also determine whether the recipient computing device satisfies criteria relating to resources of the recipient computing device. The communication module 206 can send the content item to the recipient computing device if the criteria for sharing the content item are satisfied.

In some embodiments, the communication module 206 can send a content item incrementally. A portion of a content item can be sent to the recipient computing device at one time, instead of sending the entire content item. As an example, a content item can have different parts, such as main content, information regarding likes, and information regarding comments. The sender computing device can send the main content of the content item first, and the information regarding likes and the information regarding comments of the content item at a later time. If the recipient computing device does not have the entire content item, a remainder of the content item or any portion thereof can be sent to the recipient computing device. Accordingly, the communication module 206 can check whether a content item that is on the recipient computing device is the entire content item. If the content item on the recipient computing device is missing any data, the communication module 206 can send the missing data or any portion of the missing data to the recipient computing device. In certain embodiments, there can be updates to a content item that is on the recipient computing device. For example, updates to a content item can include updates to various parts of the content item. Accordingly, the communication module 206 can check whether a content item that is on the recipient computing device is up-to-date. If the content item on the recipient computing device is not up-to-date, the communication module 206 can send updates for the content item to the recipient computing device.

The optimization module 208 can optimize sending content items to a computing device based on various factors. At a given time, a sender computing device may have limited resources (e.g., a particular battery level) and may not be able to send content items to all recipient computing devices that are within its proximity. Accordingly, the optimization module 208 can optimize sending content items to one or more recipient computing devices based on various factors. Examples of factors can include resources associated with a recipient computing device (e.g., battery), success of previous attempts to send content items to a recipient computing device, etc. For example, the optimization module 208 can check available resources for a recipient computing device. If a first recipient computing device has a low battery level and a second recipient computing device has a high battery level (e.g., compared to a threshold value), a sender computing device can choose to send content items to the second recipient computing device since the second recipient computing device has a higher probability of sending content items to other recipient computing devices. As another example, the optimization module 208 can check whether any previous attempts to send content items to a recipient computing device were successful. A sender computing device can choose to send content items to a first recipient computing device that has successfully received content items in the past over a second recipient computing device that has failed to receive content items in the past. The optimization module 208 can maintain a log relating to activities of a computing device in an offline mode. The log can include information associated with sending and receiving of content items to and from peer computing devices. For example, the log can indicate a device ID, a content item ID, a timestamp, a result (e.g., succeeded or failed), etc. for sending or receiving a content item. The optimization module 208 can refer to the log in order to determine to which recipient computing devices to send content items. Many variations are possible.

Peer computing devices can share content items in a chained manner. For example, a sender computing device can send content items to a recipient computing device in its proximity, and the recipient computing device in turn can send content items to another recipient computing device in its proximity, and so forth. In this way, a computing device can act as a source as well as a recipient of content items. In some embodiments, a sender computing device can be connected to a social networking system and can continuously provide content items to one or more recipient computing devices in an offline mode. The optimization module 208 can allow each sender computing device to optimize sending of content items to one or more recipient computing devices such that a probability of content items being provided to other recipient computing devices down the chain can be increased. In this way, a chain of providing content items between peer computing devices can be optimized.

The synchronization module 210 can synchronize content items obtained in an offline mode and related information with a server associated with a social networking system. A user can access and interact with content items that are available in the offline mode. For example, a user can view content items obtained in the offline mode, and the user can like, comment on, and/or share the content items. However, the server may not have access to content items a user received in the offline mode or a user's interactions or activities in the offline mode. Accordingly, content items received in the offline mode and a user's activities in the offline mode can be synchronized with the server when a computing device is no longer in the offline mode. The synchronization module 210 can refer to a log relating to activities in the offline mode, as described above. For example, the log can indicate a device ID of the sender computing device from which a content item was received, an ID of a content item, a timestamp associated with when a content item was received, etc. After synchronization, a user's activities in the offline mode can be reflected to relevant content items, for example, in other user's feeds, profiles, etc.

For illustrative purposes, the disclosed technology is described in connection with a social networking system, but the disclosed technology can apply to any type of application and/or system. For example, the disclosed technology can apply to a messaging application. Peer computing devices in sufficient proximity can send and receive messages in an offline mode, and offline mode activities can be synchronized with a server when the peer computing devices are no longer in the offline mode. All examples herein are provided for illustrative purposes, and there can be many variations and other possibilities.

Figure 3A:
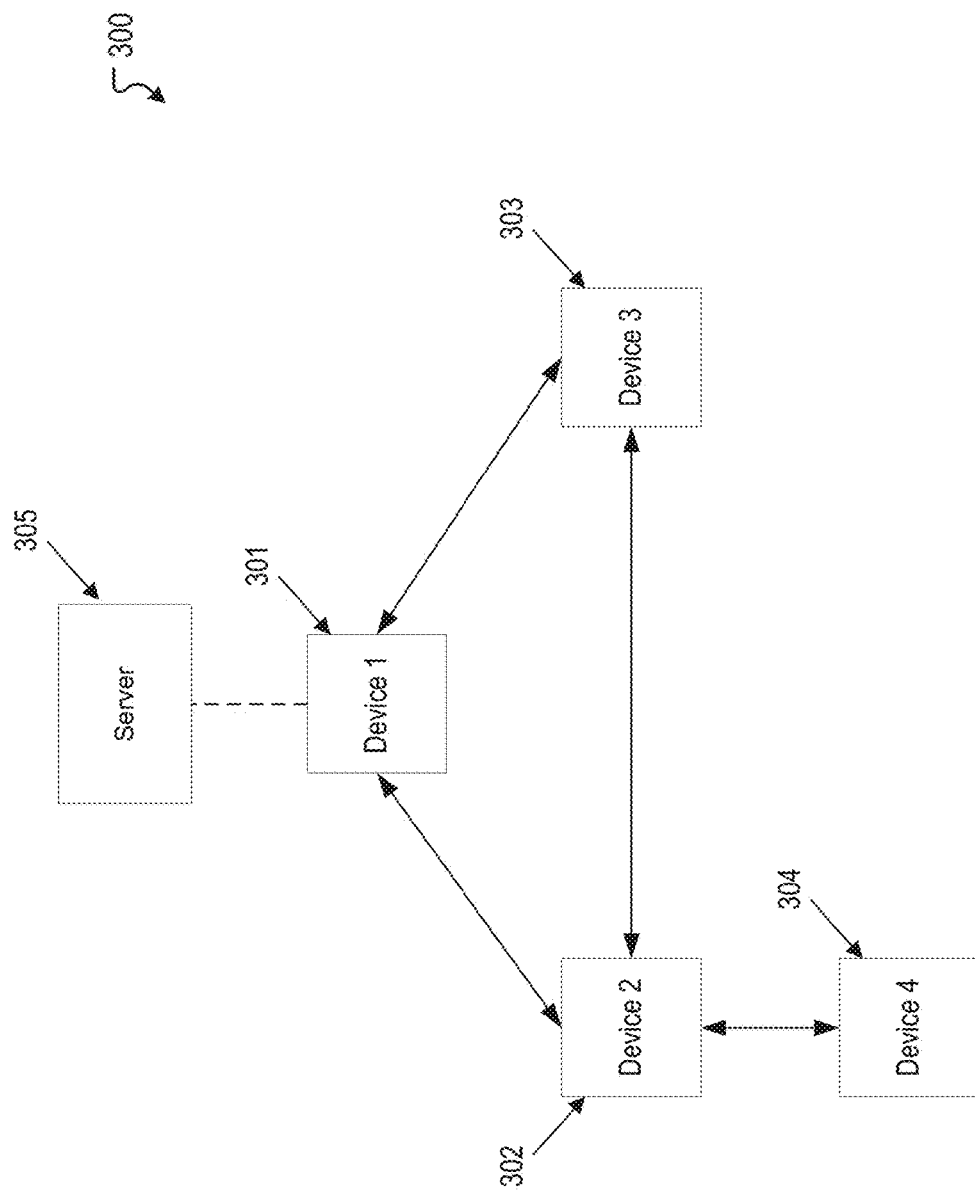
FIG. 3A illustrates an example scenario for providing automated sharing of content items in a peer to peer manner, according to an embodiment of the present disclosure.

FIG. 3A illustrates an example scenario 300 for providing automated sharing of content items in a peer to peer manner, according to an embodiment of the present disclosure. The example scenario 300 shows a server 305 and four computing devices 301, 302, 303, 304. Device 1 301 may or may not be connected to the server 105. In some embodiments, Device 1 301 is connected to the server 305 and can continuously provide content items to other computing devices 302, 303. In other embodiments, Device 1 301 is not connected to the server 305 and is in an offline mode. Device 2 302, Device 3 303, Device 4 304 are not connected to the server 305 and are in the offline mode. In the example scenario 300, Device 1 301, Device 2 302, and Device 3 303 are in sufficient proximity of each other to establish a connection using a local area communication protocol. Device 2 302 and Device 4 304 are also in sufficient proximity of each other to establish a connection using a local area communication protocol. Each computing device can act as a sender computing device and a recipient computing device. Content items can be provided in a chained manner. For example, content items can be directly or indirectly provided from Device 1 301 to Device 2 302 and to Device 4 304. In particular, Device 1 301 can send a content item to Device 2 302, and Device 2 302 can in turn send the content item to Device 4 304.

Figure 3B:
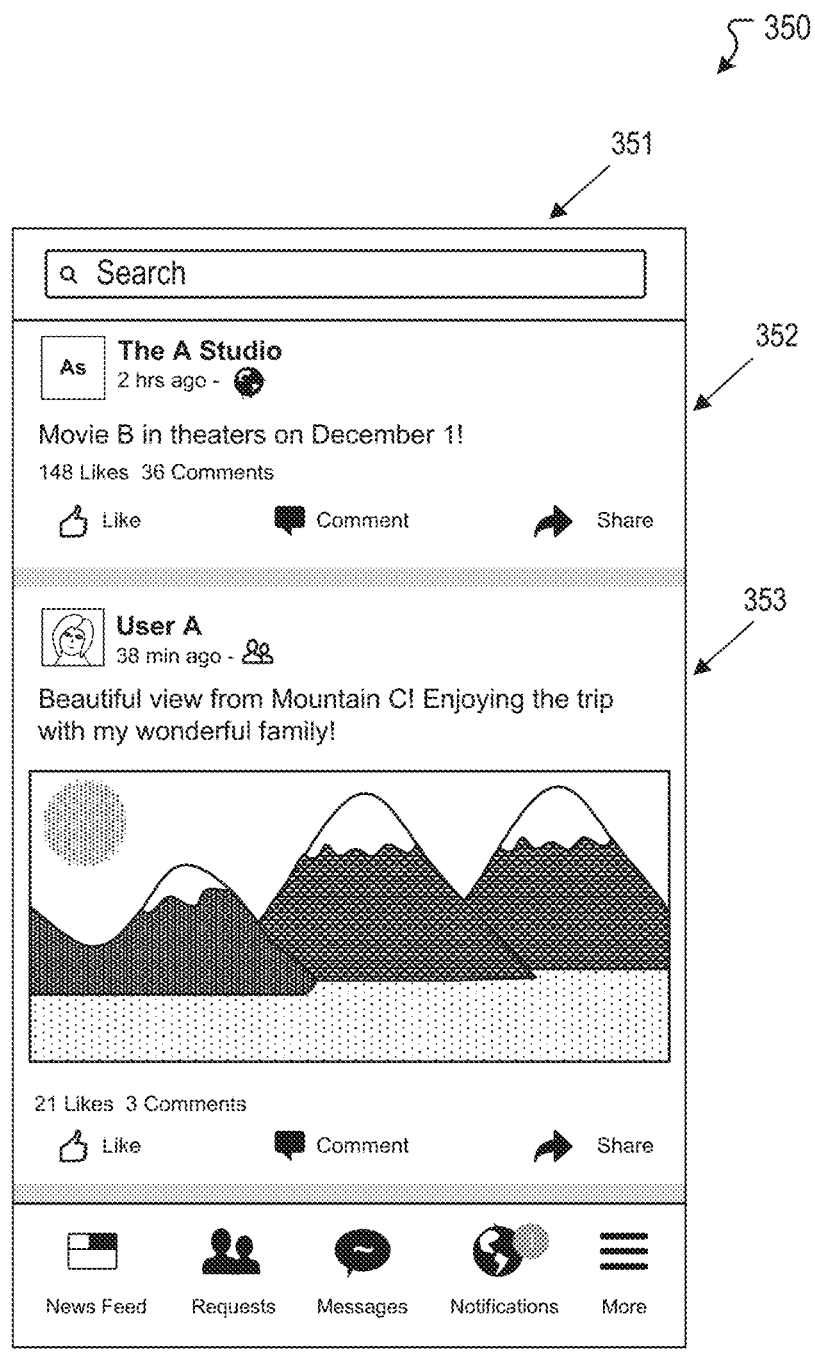
FIG. 3B illustrates an example user interface for providing automated sharing of content items in a peer to peer manner, according to an embodiment of the present disclosure.

FIG. 3B illustrates an example user interface 350 for providing automated sharing of content items in a peer to peer manner, according to an embodiment of the present disclosure. In the example scenario 350, a user interface 351 displays content items 352 and 353. Content items 352 and 353 are content items that have been obtained in an offline mode. The content item 352 is a public content item and can be provided to any computing device within sufficient proximity to establish a connection using a local area communication protocol as long as applicable criteria for sharing is satisfied. For example, a sender computing device can check if a recipient computing device has the content item 352, but does not need to check whether the recipient computing device satisfies privacy settings associated with the content item 352. A public content item may have other eligibility criteria associated with it (e.g., geographic regions), and a sender computing device can check whether a recipient computing device satisfies the other eligibility criteria. A sender computing device can also check criteria relating to resources of the sending computing device and/or a recipient computing device. Examples of public content items can include advertisements, public content items from users, etc. The content item 353 is a private content item and is associated with privacy settings. For example, as shown, User A has specified that the content item 353 is to be shared only with User A's connections. In the example scenario 350, a user associated with a computing device on which the user interface 351 is displayed is a connection of User A, and the content item 353 accordingly is provided in the user interface 351. In other instances, satisfaction of other types of criteria for sharing or various optimizations can be checked or performed before the content item 353 is provided to the computing device on which the user interface 351 is displayed.

FIG. 4 illustrates an example first method 400 for providing automated sharing of content items in a peer to peer manner, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can detect, by a first computing system, a second computing system that is capable of communicating with the first computing system based on a local area communication protocol. At block 404, the example method 400 can determine, by the first computing system, that the second computing system is in an offline mode in relation to a system. At block 406, the example method 400 can determine, by the first computing system, whether a content item is on the second computing system. At block 408, the example method 400 can send, by the first computing system, the content item to the second computing system based on the local area communication protocol, in response to determining that the content item is not on the second computing system. Other suitable techniques that incorporate various features and embodiments of the present disclosure are possible.

Figure 5:
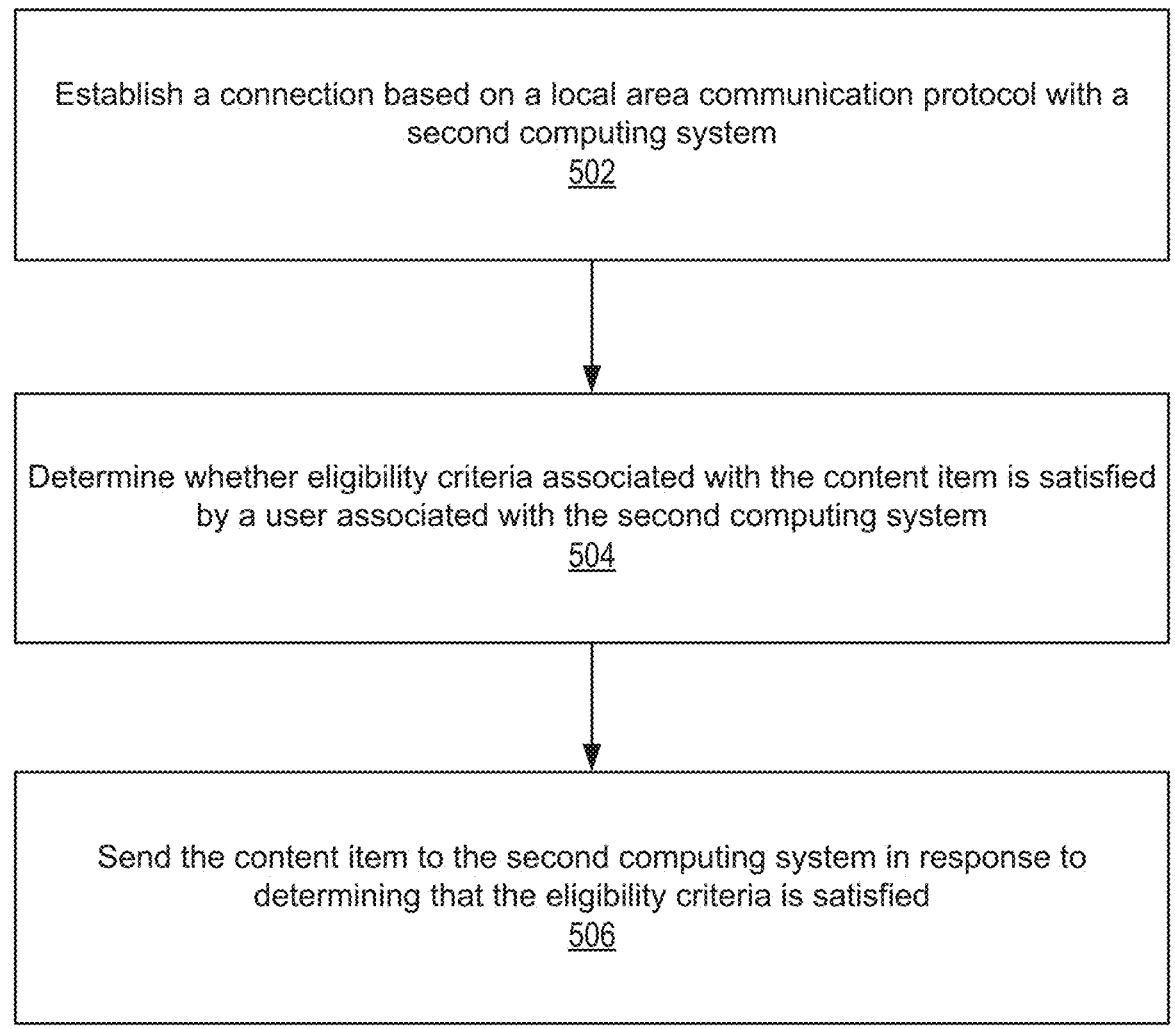
FIG. 5 illustrates an example second method for providing automated sharing of content items in a peer to peer manner, according to an embodiment of the present disclosure.

FIG. 5 illustrates an example second method 500 for providing automated sharing of content items in a peer to peer manner, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can establish a connection based on a local area communication protocol with a second computing system. The second computing system can be similar to the second computing system explained in connection with FIG. 4. The local area communication protocol can be similar to the local area communication protocol explained in connection with FIG. 4. At block 504, the example method 500 can determine whether eligibility criteria associated with the content item is satisfied by a user associated with the second computing system. At block 506, the example method 500 can send the content item to the second computing system in response to determining that the eligibility criteria is satisfied. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
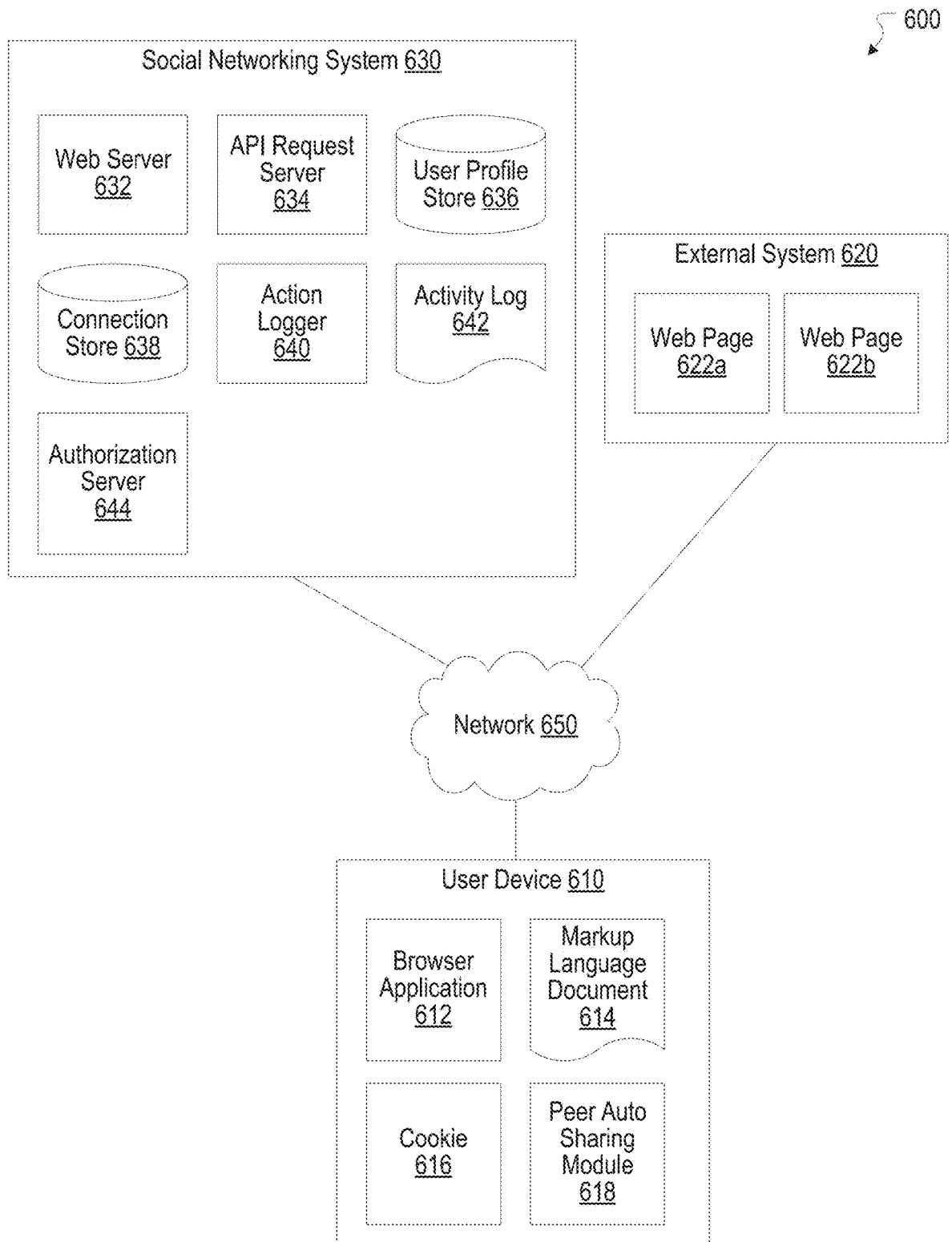
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a peer auto sharing module 618. The peer auto sharing module 618 can be implemented with the peer auto sharing module 102, as discussed in more detail herein. In some embodiments, one or more functionalities of the peer auto sharing module 618 can be implemented in the social networking system 630.

Hardware Implementation

Figure 7:
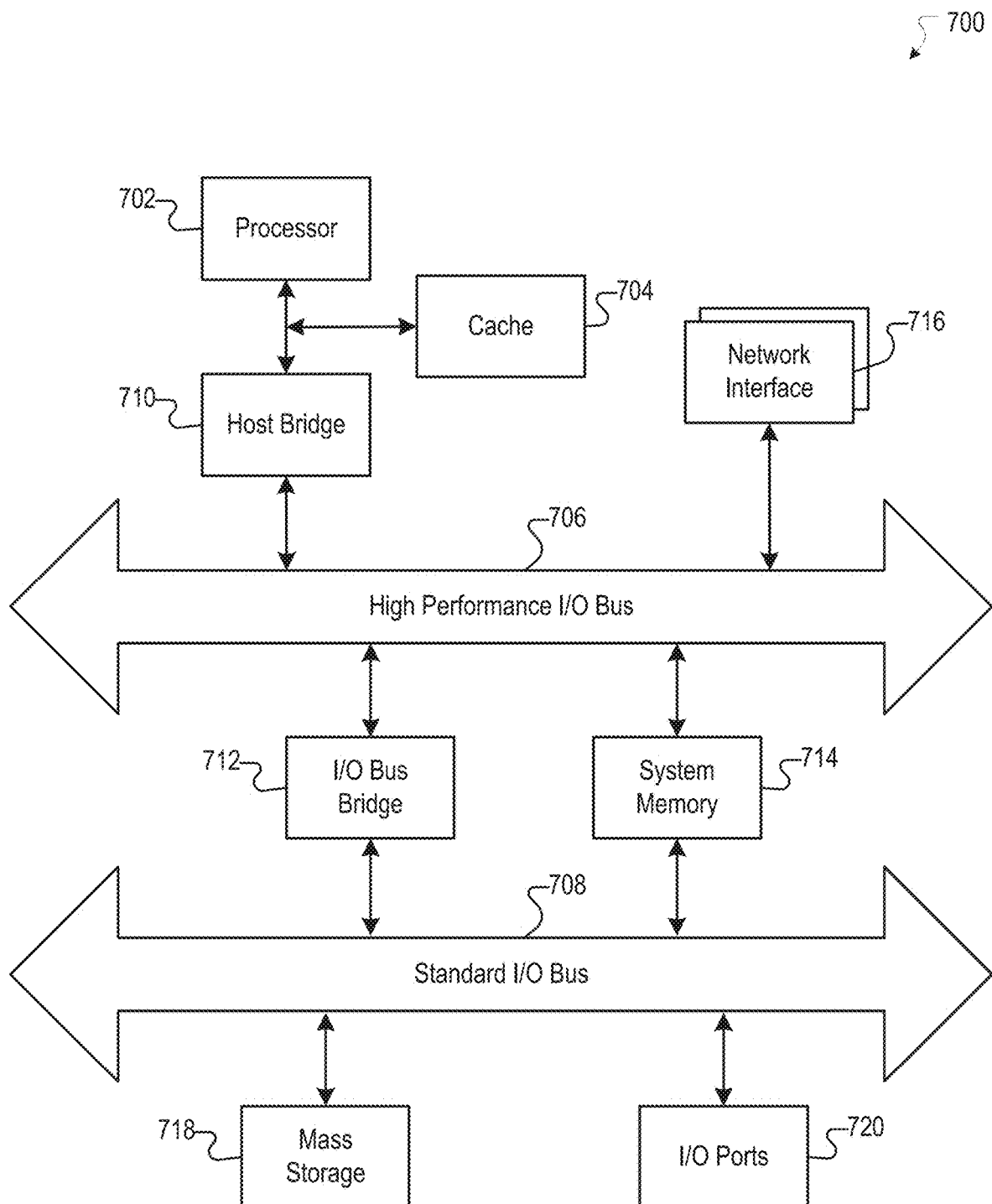
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   detecting, by a first computing system, a second computing system and a third computing system that are capable of communicating with the first computing system based on a local area communication protocol;
   determining, by the first computing system, that the second computing system and the third computing system are in an offline mode in relation to a system and have successfully received previous content items in the past;
   selecting, by the first computing system, the second computing system as a recipient computing system based on the second computing system having a higher battery level than the third computing system;
   determining, by the first computing system, whether at least a portion of a content item is on the second computing system, wherein the content item includes a main content portion and an information portion associated with the main content portion; and
   sending, by the first computing system, the information portion associated with the main content portion of the content item to the second computing system based on the local area communication protocol, in response to a determination that the main content portion is on the second computing system and the information portion associated with the main content portion is not on the second computing system.

2. The computer-implemented method of claim 1, wherein the local area communication protocol includes one or more of: Bluetooth, Wi-Fi Direct, or a wireless ad hoc network and wherein the first computing system, the second computing system, and the third computing system are peer computing systems.

3. The computer-implemented method of claim 1, wherein the system is a social networking system, and the first computing system, the second computing system, and the third computing system are associated with respective users of the social networking system.

4. The computer-implemented method of claim 1, further comprising determining whether eligibility criteria associated with the content item is satisfied by a user associated with the third computing system, and the content item is sent to the third computing system in response to determining that the eligibility criteria is satisfied.

5. The computer-implemented method of claim 4, wherein the eligibility criteria relates to one or more of: privacy settings associated with the content item or demographic characteristics associated with the content item.

6. The computer-implemented method of claim 1, further comprising receiving a second content item from the second computing system when the first computing system is in the offline mode.

7. The computer-implemented method of claim 6, further comprising synchronizing information relating to the second content item and one or more user activities associated with the second content item with the system, in response to determining that the first computing system is not in the offline mode.

8. The computer-implemented method of claim 7, wherein the one or more user activities include one or more of: commenting, liking, or sharing.

9. The computer-implemented method of claim 1, wherein the selecting the second computing system as the recipient device is further based on a probability of the second computing system sending the content item to other computing systems.

10. The computer-implemented method of claim 1, further comprising:
    determining, by the first computing system, whether all portions of a second content item are on the second computing system; and
    sending, by the first computing system, updates to a second information portion associated with a second main portion of the second content item to the second computing system, in response to a determination that the second content item is on the second computing system.

11. A first computing system comprising:
    at least one hardware processor; and
    a memory storing instructions that, when executed by the at least one processor, cause the system to perform:

detecting a second computing system and a third computing system that are capable of communicating with the first computing system based on a local area communication protocol;

determining that the second computing system and the third computing system are in an offline mode in relation to a system and have successfully received previous content items in the past;

selecting the second computing system as a recipient computing system based on the second computing system having a higher battery level than the third computing system;

determining whether at least a portion of a content item is on the second computing system, wherein the content item includes a main content portion and an information portion associated with the main content portion; and sending the information portion associated with the main content portion of the content item to the second computing system based on the local area communication protocol, in response to a determination that the main content portion is on the second computing system and the information portion associated with the main content portion is not on the second computing system.

12. The system of claim 11, wherein the local area communication protocol includes one or more of: Bluetooth, Wi-Fi Direct, or a wireless ad hoc network and wherein the first computing system, the second computing system, and the third computing system are peer computing systems.

13. The system of claim 11, wherein the instructions further cause the system to perform determining whether eligibility criteria associated with the content item is satisfied by a user associated with the third computing system, and the content item is sent to the third computing system in response to determining that the eligibility criteria is satisfied.

14. The system of claim 11, wherein the instructions further cause the system to perform receiving a second content item from the second computing system when the first computing system is in the offline mode.

15. The system of claim 14, wherein the instructions further cause the system to perform synchronizing information relating to the second content item and one or more user activities associated with the second content item with the system, in response to determining that the first computing system is not in the offline mode.

16. A non-transitory computer readable medium including instructions that, when executed by at least one hardware processor of a first computing system, cause the first computing system to perform a method comprising:

detecting a second computing system and a third computing system that are capable of communicating with the first computing system based on a local area communication protocol;

determining that the second computing system and the third computing system are in an offline mode in relation to a system and have successfully received previous content items in the past;

selecting the second computing system as a recipient computing system based on the second computing system having a higher battery level than the third computing system;

determining whether at least a portion of a content item is on the second computing system, wherein the content item includes a main content portion and an information portion associated with the main content portion; and sending the information portion associated with the main content portion of the content item to the second computing system based on the local area communication protocol, in response to a determination that the main content portion is on the second computing system and the information portion associated with the main content portion is not on the second computing system.

17. The non-transitory computer readable medium of claim 16, wherein the local area communication protocol includes one or more of: Bluetooth, Wi-Fi Direct, or a wireless ad hoc network and wherein the first computing system, the second computing system, and the third computing system are peer computing systems.

18. The non-transitory computer readable medium of claim 16, wherein the method further comprises determining whether eligibility criteria associated with the content item is satisfied by a user associated with the third computing system, and the content item is sent to the third computing system in response to determining that the eligibility criteria is satisfied.

19. The non-transitory computer readable medium of claim 16, wherein the method further comprises receiving a second content item from the second computing system when the first computing system is in the offline mode.

20. The non-transitory computer readable medium of claim 19, wherein the method further comprises synchronizing information relating to the second content item and one or more user activities associated with the second content item with the system, in response to determining that the first computing system is not in the offline mode.

* * * * *